United States Patent
Ortega (10) Patent No.: US 8,714,498 B2
(45) Date of Patent: May 6, 2014

(54) TRAY STAND

(75) Inventor: Steven Ortega, Discovery Bay, CA (US)

(73) Assignee: IP Holdings, LLC, Vancouver, WA (US)

( * ) Notice: Subject to any disclaimer, the term of this patent is extended or adjusted under 35 U.S.C. 154(b) by 0 days.

(21) Appl. No.: 13/136,657

(22) Filed: Aug. 8, 2011

(65) Prior Publication Data

US 2012/0199707 A1    Aug. 9, 2012

Related U.S. Application Data

(60) Provisional application No. 61/462,760, filed on Feb. 8, 2011.

(51) Int. Cl.
*F16M 11/00* (2006.01)
*A47B 13/02* (2006.01)

(52) U.S. Cl.
USPC ......... 248/165; 108/153.1; 211/189; 248/151

(58) Field of Classification Search
USPC ......... 211/182, 186, 189, 190, 191, 192, 194; 108/180, 181, 182, 189, 190, 153.1, 108/192, 156; 248/129, 146, 150, 151, 154, 248/158, 165, 97; 52/651.01, 651.1, 653.1; 403/169, 217, 265
See application file for complete search history.

(56) References Cited

U.S. PATENT DOCUMENTS

| | | |
|---|---|---|
| 1,912,847 A | 6/1933 | Klepel |
| 2,695,712 A | 11/1954 | Kolander |
| 2,794,496 A | 6/1957 | Strand |
| 3,013,670 A | 12/1961 | Mayer |
| 3,121,496 A | 2/1964 | Brunette |
| 3,172,376 A | 3/1965 | Havlis |
| 3,189,363 A | 6/1965 | Pierrat |
| 3,599,580 A | 8/1971 | Adair et al. |
| 3,765,541 A * | 10/1973 | Madey et al. ................. 211/182 |
| 3,787,072 A | 1/1974 | DeBoer et al. |
| D240,871 S | 8/1976 | Herman |
| 3,997,139 A | 12/1976 | Young et al. |
| 4,099,735 A | 7/1978 | Becker, III |
| 4,179,169 A | 12/1979 | Daniels et al. |
| D254,994 S | 5/1980 | Miereanu et al. |
| 4,419,938 A * | 12/1983 | Kaut ............................. 108/190 |
| 4,516,376 A * | 5/1985 | King ............................. 403/171 |
| 4,630,550 A | 12/1986 | Weitzman |
| 4,684,087 A * | 8/1987 | Spickard ........................ 248/97 |
| 4,832,421 A | 5/1989 | Shoffner |
| D304,982 S | 12/1989 | Bush et al. |
| 4,974,526 A | 12/1990 | Wiygul, Jr. |
| D321,571 S | 11/1991 | Lucariello |
| 5,257,794 A * | 11/1993 | Nakamura .................... 280/79.3 |

(Continued)

*Primary Examiner* — Tan Le
(74) *Attorney, Agent, or Firm* — J. Douglas Wells; Robert J. Ireland (57) ABSTRACT

A modular portable stand that can be quickly and easily assembled and disassembled by a solo user without the need for any tools or hardware in a very short time. In its disassembled condition, the stand includes a first and second base frame, a first and second side frame, and four legs, for a total component count of eight, with only three unique components, the base frame, side frame, and leg. The modularity of components provides simplified manufacturing, while allowing for relatively small disassembled packaging for transport, shipping or storage. The interlocking of the components at each corner provides a stiff and sturdy perimeter frame when assembled, that becomes more rigid as loaded with plant propagation trays, fish tanks, or other heavy items than require level secure support.

3 Claims, 5 Drawing Sheets

(56) References Cited

U.S. PATENT DOCUMENTS

| | | | |
|---|---|---|---|
| 5,313,725 A | 5/1994 | DeVassie | |
| 5,335,605 A | 8/1994 | Drabczyk | |
| 5,370,245 A | 12/1994 | Tersch et al. | |
| 5,437,165 A | 8/1995 | White | |
| 5,517,928 A * | 5/1996 | Erdman | 108/180 |
| 5,527,103 A | 6/1996 | Pittman | |
| 5,531,464 A * | 7/1996 | Maurer et al. | 211/189 |
| 5,645,331 A | 7/1997 | Eddy et al. | |
| 5,678,706 A * | 10/1997 | Husak et al. | 211/189 |
| 5,931,019 A | 8/1999 | White | |
| 5,941,183 A * | 8/1999 | Ming-Shun | 108/153.1 |
| 5,954,412 A | 9/1999 | Rutherford et al. | |
| 6,027,000 A * | 2/2000 | Sterzel et al. | 211/182 |
| 6,073,320 A | 6/2000 | Salatin et al. | |
| 6,213,333 B1 | 4/2001 | Icard | |
| 6,454,261 B2 | 9/2002 | Ohira | |
| 6,550,791 B2 | 4/2003 | Ramsey | |
| 6,651,456 B1 | 11/2003 | White | |
| 6,811,163 B1 | 11/2004 | Gurule et al. | |
| 6,948,435 B1 * | 9/2005 | Sheng | 108/192 |
| 6,969,077 B2 | 11/2005 | Liu | |
| 7,055,834 B1 | 6/2006 | White et al. | |
| 7,165,749 B2 | 1/2007 | Venzia | |
| 2007/0095770 A1 | 5/2007 | Backofen | |
| 2009/0284111 A1 | 11/2009 | Hazzard et al. | |
| 2012/0199707 A1 * | 8/2012 | Ortega | 248/165 |

* cited by examiner

TRAY STAND

CROSS-REFERENCE TO RELATED APPLICATION

This application claims the benefit of U.S. Provisional Patent Application Ser. No. 61/462,760 Filed Feb. 8, 2011

BACKGROUND OF THE INVENTION

1. Technical Field of the Invention

This invention relates to the field of stands, and specifically to stands used for indoor gardening or aquatics that require no tools or additional hardware when assembling or disassembling 2. Background of the Invention The present invention relates to knock-down portable stands, such as used to support heavy items at level elevations, and the invention aims to provide a portable stand of modular construction that easily assembles and disassembles without the need for tools and without requiring fasteners or hardware of any type.

Indoor gardeners utilize trays for starting, propagating, and growing plants. Ebb & flow or drip system gardeners often load a tray with plants, growing media, and water, which in aggregate can become too heavy for the common card table or plastic fold out table to support. Leaving the tray on the ground is not a good option as the standard placement of the water reservoir is directly below the tray. Having the tray elevated for easier plant tending is further desired to make the growing process more enjoyable for the user, and accessible for the disabled grower.

A stand used for growing plants that supports a propagation tray must maintain the tray at a level elevation to facilitate complete draining of water and nutrient solutions from the growing media and tray. As the bottom of the tray must be level to the ground in order to optimize ebb and flow gardening practice, the stand that holds the tray must be sturdy enough to prevent the tray from flexing or tilting, keeping the tray level and undistorted.

Like a stand used in propagation of plants, a stand used for fish tank support must also maintain a level elevation, and be strong enough to hold the weight of an aquarium, full of water, fish, and rock, with over head lights, pumps, and other components necessary for indoor aquatic practice located either above, below, or on the stand. As the nature of aquatics and growing plants includes the presence of water, the stand must not only be strong and rigid when assembled, but also resistant to water damage, and will not fail if occasionally soaked or saturated, which makes stands constructed of wood or wood composite materials undesirable.

A stand that is easy to assemble and disassemble, with the benefit of breaking it down simply to fit into a compact storage area is greatly desired. With the disabled user in mind, the assembly and disassembly process should be easy to understand with no small fasteners or hardware that would be difficult to secure with arthritis or joint pain. Ideally, no tools or hardware would be required.

A recent answer to the 'stand' problem presented has been products similar to the "Gorilla Tray Stand" that require fixating a plurality of small threaded fasteners to assemble or disassemble. The structure of the stand itself holds the tray level to the ground, is rigid, and allows for easy moving. However, the short comings of this tray stand is the complicated assembly instructions, difficult to fasten bolts and screws, difficult disassembly, all requiring the use of specialized tools.

Hence, it can be seen in the indoor gardening and indoor aquatics industry, especially for ebb and flow or drip gardening practices, that there is a need for an improved modular stand, capable of securing a propagation tray or fish tank such that it remains level and elevated to the ground, provides space under the tray or tank for a reservoir or the like, allows accessibility from all sides, is mobile, and easily assembled and disassembled. Further, other fields of art also benefit from a stand that is versatile in application and robust in design as described herein.

SUMMARY OF THE INVENTION

The stand assembles easily without tools, additional hardware, or complicated instructions. In the preferred modular embodiment, the stand has four frame rails with each opposing frame rail having identical construction. At each corner there is a leg that facilitates the interlocking of the frame rails without fasteners, each able to receive a wheel or caster on the ground end. The entire stand disassembles by pulling up on each side rail and removing the legs, allowing the stand to quickly break down. The components are long and flat allowing for compact storage or easy packing for travel or transport. The stand can support great weights, and with the addition of cross supports, the loading capacities can be significantly increased. The cross supports fixate either on the top of the frame when used as a table top, or on the bottom of the frame when used to support a fish tank or propagation tray. When used as a propagation tray stand the device provides 360 degree access to items supported on or within the stand and items located below the stand. In the disclosed embodiment described herein, the stand is of just one specific application as a mobile plant tray stand for growing plants, whereby the plant tray fittingly inserts from the top and rests on the frame and within the stand, while a reservoir is located below to facilitate ebb and flow type gardening practice. One skilled in the art will quickly realize that many other uses and applications are readily available for the stand, including but not in any way limited to a quick to assemble table, fish tank stand, marketing display, or moving dolly.

OBJECTS AND ADVANTAGES

These and other advantages and features of the present invention are described herein so as to make the present invention understandable to one of ordinary skill in the art:

1. Versatile in application
2. Robust in construction
3. Only eight components: four frame rails and four legs
4. Only three unique components: base frame, side frame, and leg
5. Optional cross bars easily attach sides for increasing loading capacity
6. Interlocking at the corners provides a rigid and sturdy stand
7. Rigidity and strength increase with added load
8. Movable with inclusion of wheels at the bottom of each of the four legs
9. No tools or special equipment needed to assemble/disassemble
10. Simple to understand assemble/disassemble instructions
11. Fast assembly/disassembly
12. Stores in compact spaces when disassembled
13. Easily transportable when disassembled
14. No hardware

BRIEF DESCRIPTION OF THE FIGURES

Elements in the figures have not necessarily been portrayed to scale in order to enhance their clarity and improve understanding of these various elements of just one embodiment of the invention. Furthermore, elements that are known to be common and well understood to those in the industry are not depicted in order to provide a clear view of the invention, thus the drawings are generalized in form in the interest of clarity and conciseness. Only one embodiment is shown in the FIGS. 1-7, however, many other embodiments are readily available by simply modifying the length and shape of the sides to form different frame perimeters of squares or rectangle frames for receiving flat table tops, rectangular or square bottomed aquariums, tool boxes, or essentially anything having a four sided bottom. The depth of the frame may be increased or decreased without changing the inventive features for applications requiring a deeper inset of the item to be supported. Other applications for the stand include moving dolly's or mobile display stands commonly used at conventions or marketing shows. The compact storage and easy assembly/disassembly creates versatility in functional use, while the rigid interlocking strength and wheeled mobility creates almost limitless relevance as an appliance in the home, garage, garden, or convention center.

DETAILED DESCRIPTION OF THE FIGURES

In the following discussion that addresses one embodiment of the present invention, reference is made to the accompanying figures that form a part hereof, and in which is shown by way of illustration, one specific embodiment in which the invention may be practiced. It is to be understood that other embodiments may be realized and utilized with changes made without departing from the scope of the present invention. Various inventive features are described below that can each be used independently of one another or in combination with other features.

Figure 1:
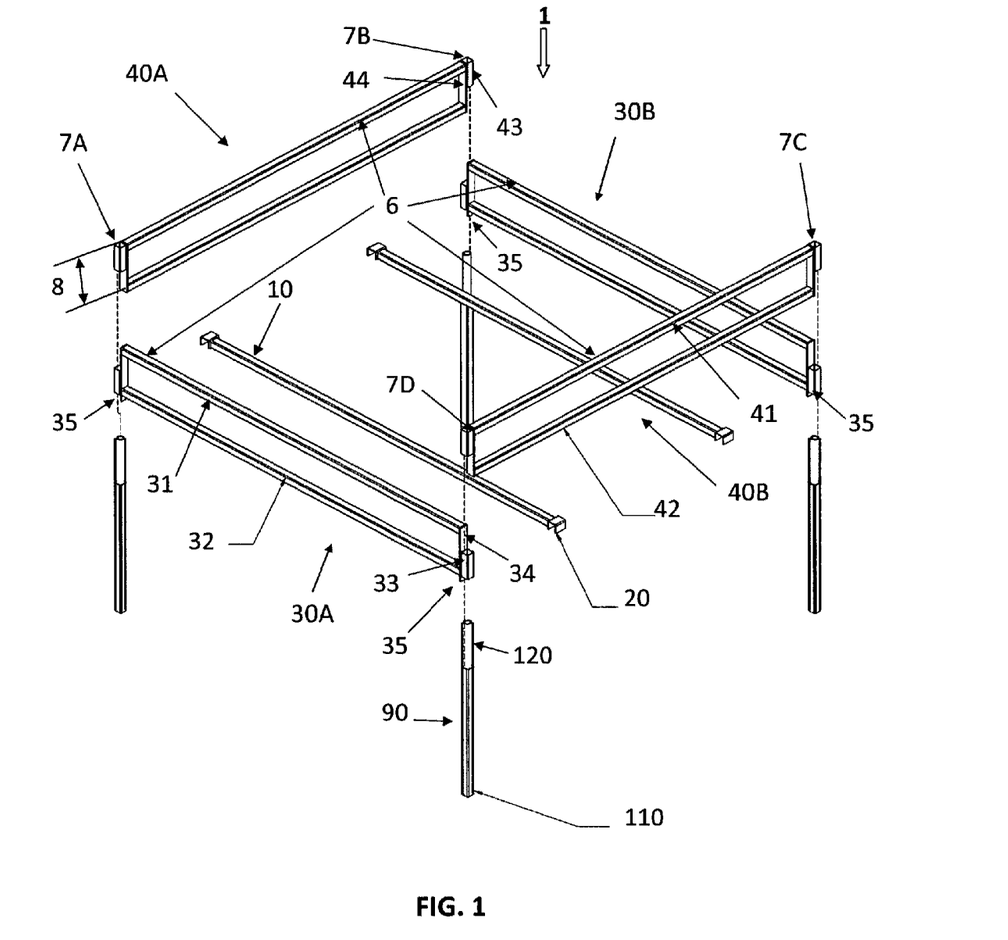
FIG. 1 is a perspective view of one embodiment of the modular tray stand as disassembled in an exploded view.

FIG. 1 shows a perspective view of one embodiment of the modular tray stand as disassembled in an exploded view. The preferred embodiment is constructed primarily of square tubing, but could be constructed from sheet metal, round tubing, cast aluminum or injection molded in plastic and depending on the application, would benefit from combinations of the above materials in the construction of the stand.

The frame perimeter 6 is defined by the top surfaces of the first base frame 30A, second base frame 30B, a first side frame 40A, and second side frame 40B. The frame perimeter 6 is the surface on or in which the supported item may rest. For the application as a plant tray stand, the plant tray would insert within the frame perimeter 6, and rest upon the top of the frame perimeter 6. For heavier support applications, cross supports 10 are added to increase rigidity to the stand 1, while also providing additional support under the item to be supported, in this embodiment the propagation tray, to prevent distortion or unlevel support. The frame perimeter 6 may be of any four sided shape having any desired length and width matching the requirements of the item to be supported. The depth 8 of the stand is also adaptable to accommodate the desired item to be supported.

In FIG. 1, the frame perimeter 6 is defined and described in clockwise order by a first base frame 30A, a first side frame 40A, a second base frame 30B and a second side frame 40B. At each corner 7A-D, a leg 90 extends down towards the ground where a wheel 100 maybe be conveniently engaged for the purposes of making the stand 1 mobile.

Figure 3:
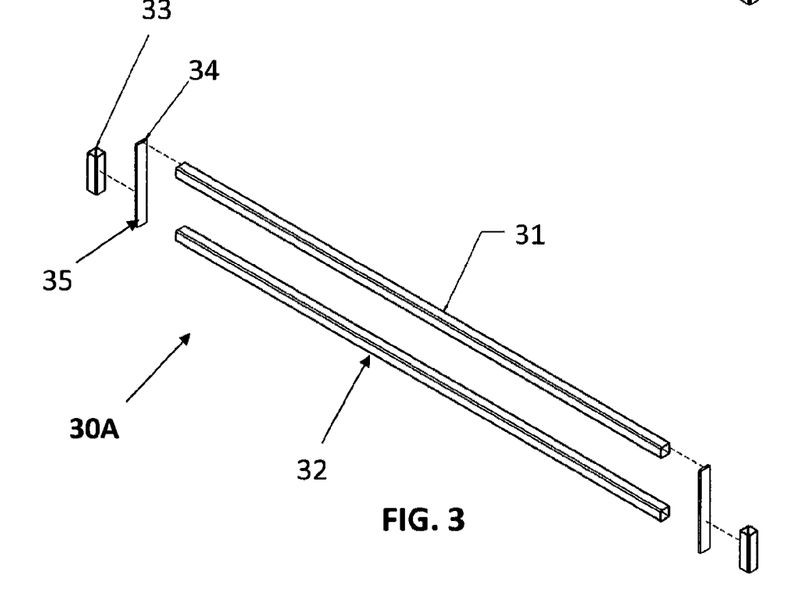
FIG. 3 is a perspective view of the base frame shown of FIG. 1.
Figure 4:
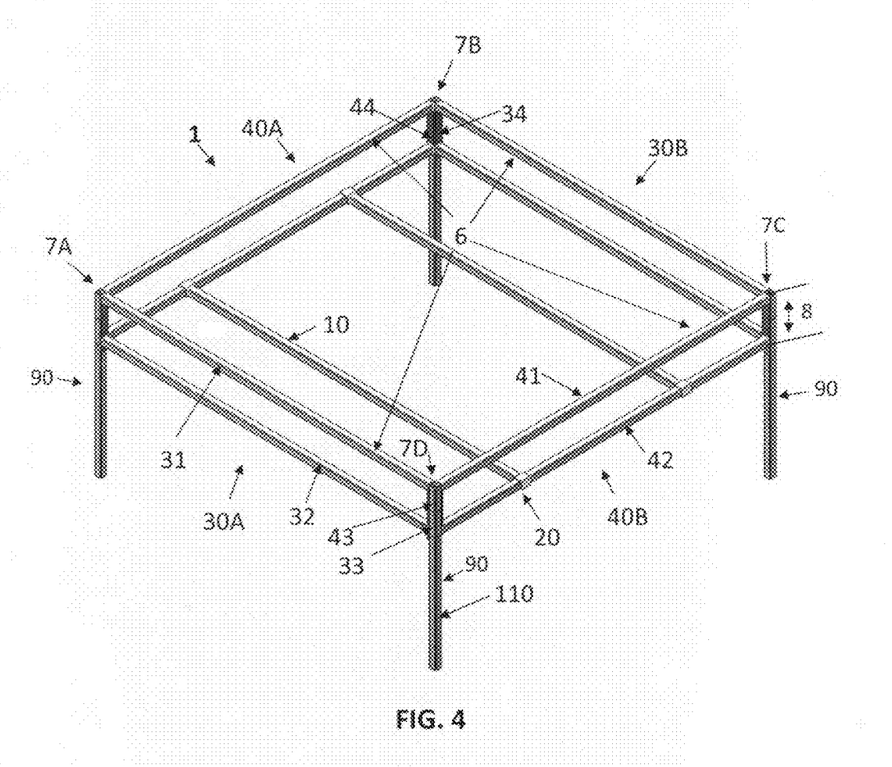
FIG. 4 is a perspective view of the assembled embodiment shown in FIG. 1 as exploded.
Figure 5:
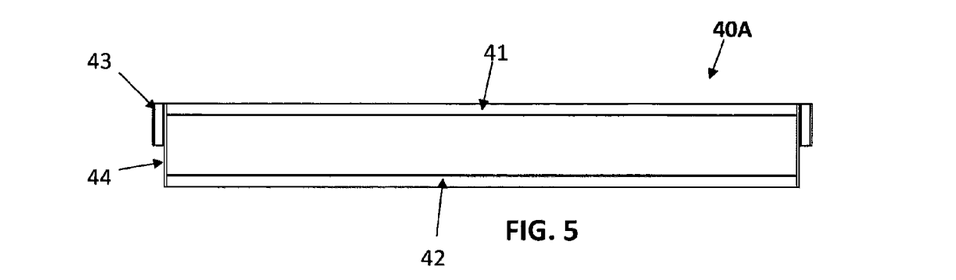
FIG. 5 is a side view of the side frame shown of FIGS. 1, 2 and 4.
Figure 6:
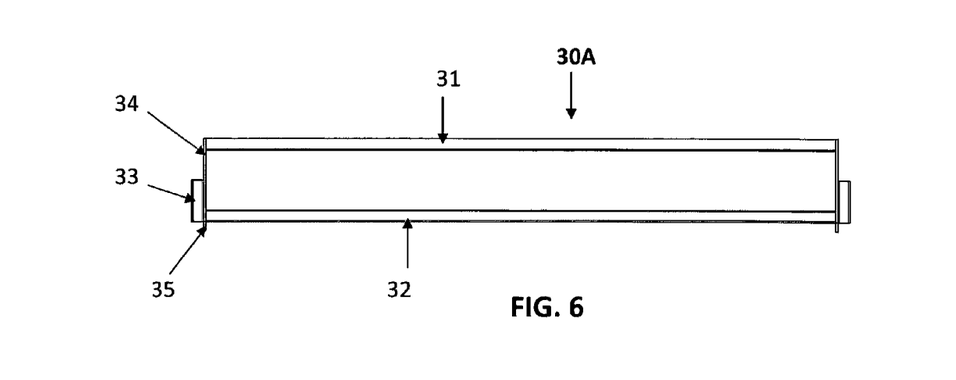
FIG. 6 is a side view of the base frame shown of FIGS. 1, 3 and 4.

As shown in FIGS. 1, 3, and 4, the first base frame 30A and second base frames 30B are identical in construction, thereby making for economical manufacture. For the manufacture of the preferred embodiment, the base top tube 31 and base bottom tubes 32 are constructed of square metal tubing cut at the same length matching the corresponding frame perimeter 6 shape and size. The base top tube 31 and base bottom tube 32 are located parallel to one another, at a distance between each matching the desired depth 8 of the stand 1. A base flat plate 34 is welded onto each of the ends of the base top tube 31 and base bottom tube 32 such that a tab 35 extends past the base bottom tube 32 at both of the bottom tube's 32 ends. For the preferred embodiments shown, the base receiver 33 is constructed from square tubing, and in length matching half the length of the flat plate 34 not including the tab 35. The base receiver 33 is welded to each base flat plate 34 as shown.

Figure 2:
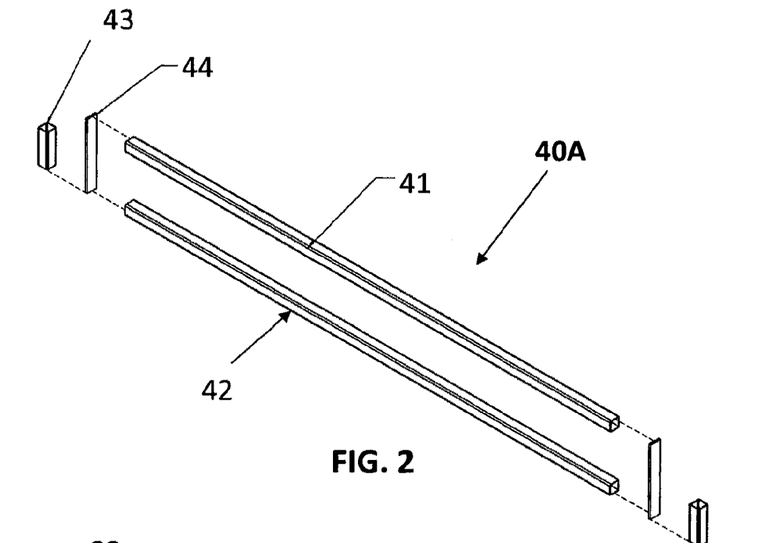
FIG. 2 is a perspective view of the side frame shown of FIG. 1.

As shown in FIGS. 1, 2, and 4, the first side frame 40A and second side frame 40B are identical, and constructed in the same manner as the first base frame 30A and second base frame 30B with the only difference being the side flat plate 44 being shorter as no tab extends past the side top tube 41 or side bottom tube 42.

In FIGS. 1, 2, 3, and 4, the preferred embodiment benefits from the side receiver 43 being of the same length as the base receiver 33, which allows for easier and more economical manufacture as all of the receivers are of the same construction.

Figure 8:
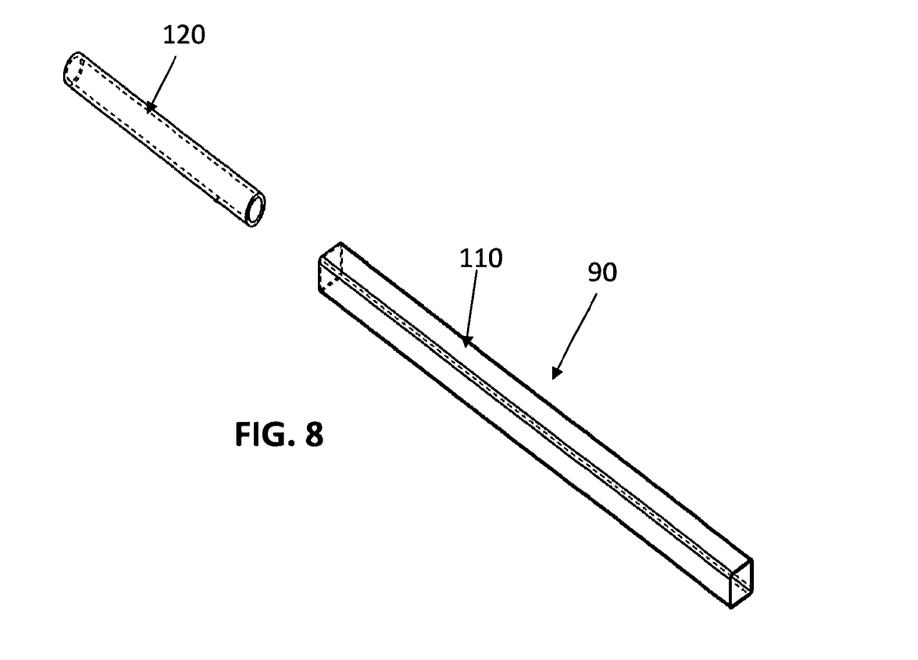
FIG. 8 is a perspective view of the leg shown in FIGS. 1 and 4 pre-fabrication.

As shown in FIGS. 1, 4, and 8, the four legs 90 have at least one flat side 110 and a dowel 120 on one end. For mobile applications a wheel 100 is engaged at the opposing leg 90 end from the dowel 120. The dowel 120 is of sufficient size to fittingly insert within the base receivers 33 and side receivers 43. As shown in the preferred embodiment, the dowel 120 is constructed of round tubing that is just small enough to fit within the base receivers 33 and side receivers 43. Tubing was used in the preferred embodiment to keep the overall weight down, however, the dowel 120 may be of solid rod material, or schedule 40 pipe, all depending on the application.

As shown assembled in FIG. 1, the dowel 120 does not extend out of the side receiver 43, however, in other embodiments and applications the dowel 120 is of greater length and extends out of the receiver 43 providing mounting structure to facilitate the addition of other items such as light racks, plant training web, irrigation systems, covers, and other added features to increase the versatility of the stand.

FIG. 3 shows a close up of the presented embodiment for the first and second base frames 30A and 30B with the base receiver 33, base flat plate 34 and tab 35.

A base top tube 31 and base bottom tube 32 fixate to the flat plate 34 by weld as shown, but any other fixation means is sufficient.

FIG. 4 shows a close up of the presented embodiment for the first and second side frames 40A and 40B, with the side receivers 43, side flat plates 44 and no tab. A side top tube 41 and a side bottom tube 42 fixate to the flat plate 44 by weld as shown, but any other fixation means is sufficient.

FIG. 8 shows a close up of the leg 90 having the flat side 110, and dowel 120. The leg 90 is able to accept wheel, as wheels are not desirable in all applications, so having the wheels easily detach is desired, and many wheel attachment and detachment methods are well known in the art and therefore not disclosed herein.

Figure 7:
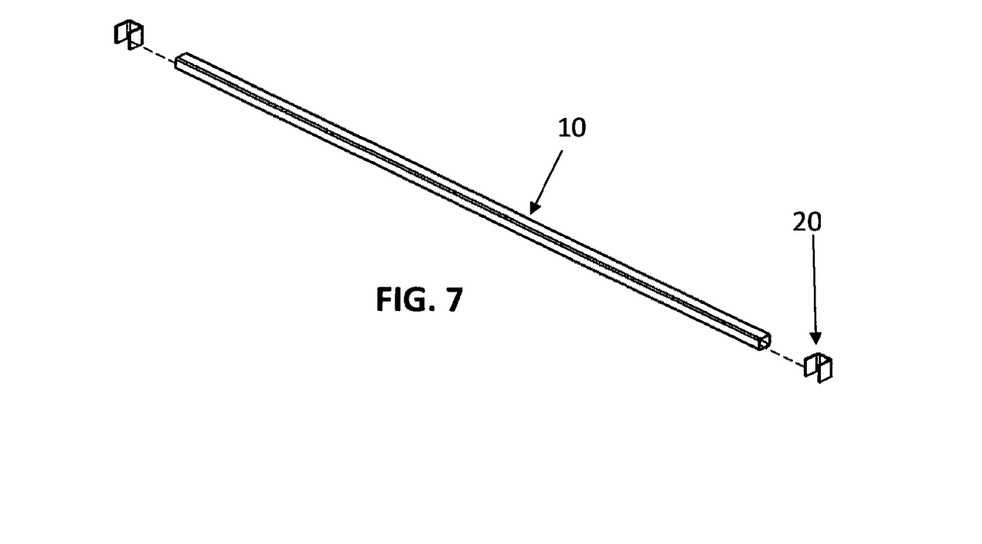
FIG. 7 is a perspective view of the cross support shown of FIGS. 1 and 4.

FIG. 7 shows a close up view of the cross supports 10 and U sleeve 20. These cross supports 10 may be constructed with adjustability to enable different depths of plant trays to be used as discussed earlier. Ideally, the U sleeve 20 is of shape and size such that the base top tube 31, base bottom tube 32, side top tube 41 or side bottom tube 42 fittingly insert within the crux of the "U" shape, thereby allowing fixation, without fasteners, screws, or bolts. For applications to support great mass, or in the indoor gardener setting, requiring significant water and growing media in the tray or for deeper trays that simply hold more weight, cross supports 10 having slip over U sleeve 20 provide under tray support, while increasing strength, stability, and rigidity to the entire tray stand as shown in FIG. 1 assembled.

One possible method of assembling the stand by a solo assembly involves a first step, which is to align the dowel 120 of each leg 90 shown in FIG. 8, with the base receivers 33 shown in FIG. 3, and insert the dowel 120 first through the tab 35 end of the base receivers 33 one at a time until all dowels 120 are fully and fittingly inserted within the base receivers 33. Each dowel 120 should protrude out the other side of each base receiver 33 of each tab 35 parallels in mating contact to a flat side 110 of each leg.

The second step in a one person assembly is to locate the now inserted legs 90 and the first and second base frames 30A and 30B parallel to one another, and spaced apart at a distance approximately matching the length of the first side frame 40A and second side frame 40B.

The third and final step in a one person assembly is to position the first side frame 40A such that the exposed side flat plate 44 end of the side receivers 43 are over and aligned with the dowels 120 protruding from the first base frame 30A and the corresponding end of second base frame 30B such that when the first side frame 40A is brought down the exposed flat plate 44 comes to rest against one side of the corresponding base receiver 33, and the dowels 120 fittingly slide within the corresponding side receivers 43 such that corners 7A and 7B are defined and three sides of the perimeter frame 6 is defined as shown in FIG. 1. The second side frame 40B is slid over the remaining protruding dowels 120 in the same manner as the first side frame 40A, thereby completing the four sides and frame perimeter 6 and defining corners 7C and 7D as shown assembled in FIG. 4. Disassembly is the same except in reverse order.

Another method of assembly involves assembling the stand one corner 7A-D at a time: First by inserting one end of the first leg 90 through one end of the first base frame 30A and then inserting the same end of the first leg 90 through one end of the first side frame 40A, locating the other end of the first leg towards the ground, thereby forming a first corner 7A of the stand 1; Second, by inserting one end of the second leg 90 through one end of the second base frame 30B, and then inserting the same end of the second leg 90 through the other end of the first side frame 40A, locating the other end of the second leg 90 towards the ground thereby forming a second corner 7B; Third, by inserting one end of the third leg 90 through the other end of the first base frame 30A, and then inserting the same end of the third leg through one end of the second side frame 40B, locating the other end of the third leg towards the ground thereby forming the third corner 7C; and Fourth, inserting one end of the fourth leg 90 through the other end of the second base frame 30B, and then inserting the same end of the fourth leg 90 through the other end of the second side frame 40B, locating the other end of the fourth leg towards the ground thereby forming the fourth corner 7D. When all four legs have been inserted as per steps above, the stand 1 will ready to receive plant tray, table top, fish tank, or any other square or rectangular base object.

Once assembled as shown in the preferred embodiment in FIGS. 1-8, each base flat plate 34 and side flat plate 44 parallels in mating contact with a corresponding side of a base receiver 33 and side receiver 43, whereby the first and second base frames 30A and 30B rigidly interlock with the first and second side frames 40A and 40B having the dowel 120 maintain the interlocking alignment and rigidly engage the corresponding leg 90 at the corresponding corners 7A-D. The weight of the components of the stand 1 provides the constant force to maintain the interlock at the corners locking the frame together once assembled as shown in FIG. 4. As weight is added to the frame perimeter, or at optional cross supports 10, the components deflect and distort minimally thereby tightening the interlocking effect at the corners 7A-D, and increasing the strength and rigidity of the stand 1. In short, the more weight added, the stronger the interlock, and more stable the stand becomes. Remove the weight, and the stand 1 easily knocks down into it's modular components for quick and convenient storage or transport.

What is claimed is:

1. A modular portable stand comprising:
   a first base frame and a second base frame each having a base receiver at each end fixated to a base flat plate, said bade flat plate extending past said base receiver forming a tab;
   a first side frame and a second side frame each having a side receiver at each end;
   a cross member having U shaped ends that removably engage either the base frames or side frames; and
   a set of four separate legs each leg having at least one flat side, constructed and arranged to align without tools or hardware said base receivers with said side receivers whereby said tabs parallel in mating contact at least one flat side of each leg such that said first base frame, first side frame, second base frame, and second side frame interlock to form a four sided frame perimeter supported by one leg at each corner.

2. A modular portable stand comprising:
   a first base frame and a second base frame each having a base receiver at each end fixated to a base flat plate, said base flat plate extending past said base receiver forming a tab;
   a first base frame and a second base frame each having a side receiver at each end; and
   a set of four separate legs, each leg constructed from flat sided tubing having a dowel extending from one end, constructed and arranged to insert into said base receiver and them insert into said side receiver until one flat side of each leg parallels in mating contract with said tab thereby aligning without tools or hardware said base receivers with said side receivers such that said first base frame, first side frame, second base frame, and second side frame interlock to form a four sided frame perimeter supported by one leg at each corner, wherein each leg has a lower member and an upper member, the lower member constructed from round tubing matching the size of the base receivers, and the upper member constructed from round tubing that fittingly inserts partially and fixates within the lower member with remainder protruding to form a dowel arranged to fittingly insert and align the base receivers with the side receivers.

3. A modular portable stand comprising:

a first base frame having a base top tube and base bottom tube, two flat base plates, and two base receivers, the side top tube and base bottom tube being fixated parallel to one another at each end to the base flat plates with each side receiver fixating to each base flat plate, said base flat plate extending past said receiver forming a tab;

a second side frame being of identical construction as the first side frame;

a first side frame having a side top tube and side botto tube, two flat side plates, and two side receivers, the side top tube and side bottom tube being fixated parallel to one another at each end to the side flat plates with each side receiver fixating to each side flat plate;

a second side frame being of identical contruction as the first side frame; and a set of four individual legs arranged to insert and align without tools or hardware the base receivers with the side receivers whereby the first base frame, first side frame, second base frame, and second side frame are engaged to form a four sided frame perimeter interlocked and supported by the four separate leg, one leg at each corner, wherein at least one leg has a lower member and an upper member, the lower member constructed from square from square tubing matching the size of the base receivers, and the upper member constructed from round tubing that fittingly inserts partially and fixates within the lower member with remainder protruding to form a dowel arranged to fittingly insert and align the base receivers with the side receivers and extending out and above the side receivers creating a mounting structure above the frame perimeter.

* * * * *